Nov. 23, 1965      H. S. BLANCHARD ETAL      3,219,625
PROCESS FOR OXIDIZING PHENOLS TO POLYPHENYL
ETHERS AND DIPHENOQUINONES
Filed May 29, 1961

Inventors:
Harry S. Blanchard;
Herman L. Finkbeiner
by *[signature]*
Their Agent.

United States Patent Office 3,219,625
Patented Nov. 23, 1965

3,219,625
PROCESS FOR OXIDIZING PHENOLS TO POLY-
PHENYL ETHERS AND DIPHENOQUINONES
Harry S. Blanchard, Schenectady, and Herman L. Fink-
beiner, Ballston Lake, N.Y., assignors to General Elec-
tric Company, a corporation of New York
Filed May 29, 1961, Ser. No. 113,363
10 Claims. (Cl. 260—47)

This invention relates to a method of utilizing new compounds as catalysts in the oxidation of phenols. More specifically, this invention relates to the use of a cupric complex having the empirical formula

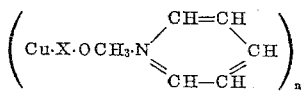

where X is selected from the group consisting of chlorine and bromine and $n$ is an integer and is at least 1, as catalysts for the oxidation of phenols, and more particularly, to the oxidation of phenols to either phenylene oxide polymers or to diphenoquinones.

In an application, Serial No. 212,128—Hay, filed July 24, 1962, which is a continuation-in-part of both Serial No. 69,245—Hay, filed November 15, 1960, now abandoned, and Serial No. 744,086—Hay, filed June 24, 1958, now abandoned, all of which are assigned to the same assignee as the present invention, there is disclosed and claimed a method of oxidizing phenols in which the catalyst is a tertiary amine and a cuprous salt soluble in the tertiary amine and capable of existing in the cupric state. Pyridine is one of the tertiary amines which may be used. Cuprous bromide or cuprous chloride are two of the cuprous salts which may be used.

We have now found that the green crystalline cupric complexes having the empirical formula

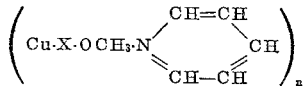

where X is selected from the group consisting of chlorine and bromine and $n$ is an integer and is at least 1, are extremely active catalysts for the oxidation of phenols either to phenylene oxide polymers, also known as polyphenylene ethers, and polyphenylene oxides, or to diphenoquinones. These new catalysts are more active and cause a faster oxidation reaction than can be obtained when the corresponding oxidation of the phenol is carried out in the presence of pyridine and cuprous chloride or cuprous bromide.

Figure 1:
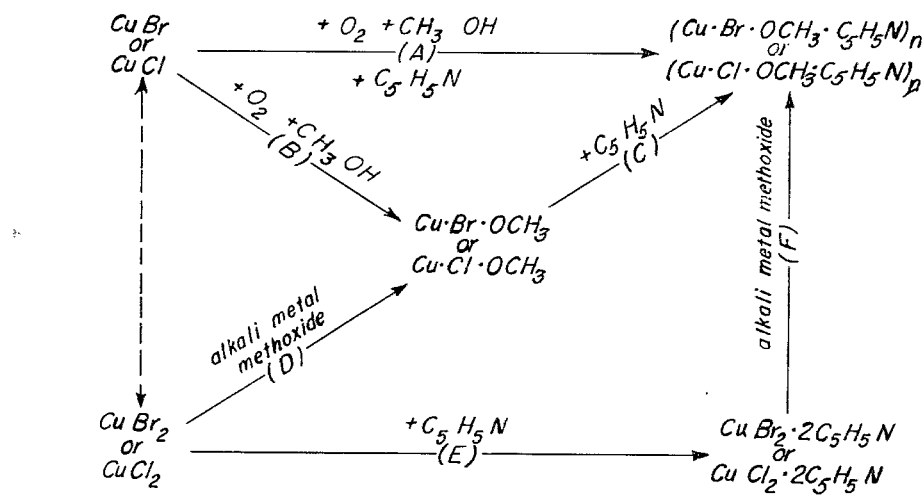

In order that those skilled in the art may better understand our invention, the following more detailed description is given which should be read in conjunction with the attendant drawings, in which:

FIG. 1 is a diagram illustrating the alternative routes by which the cupric complex corresponding to the empirical formula

Figure 2:
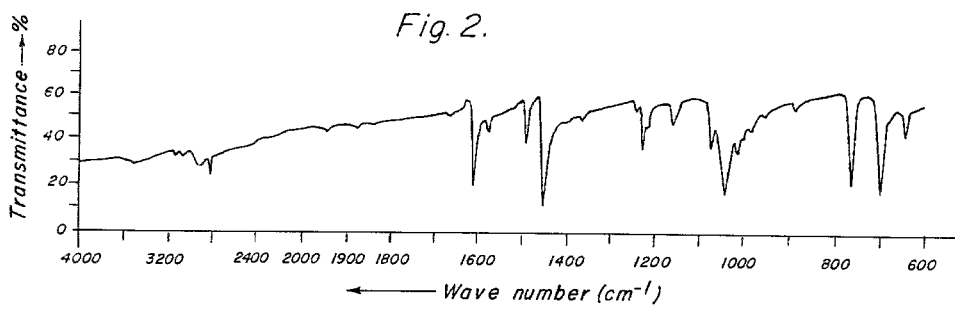
Figure 3:
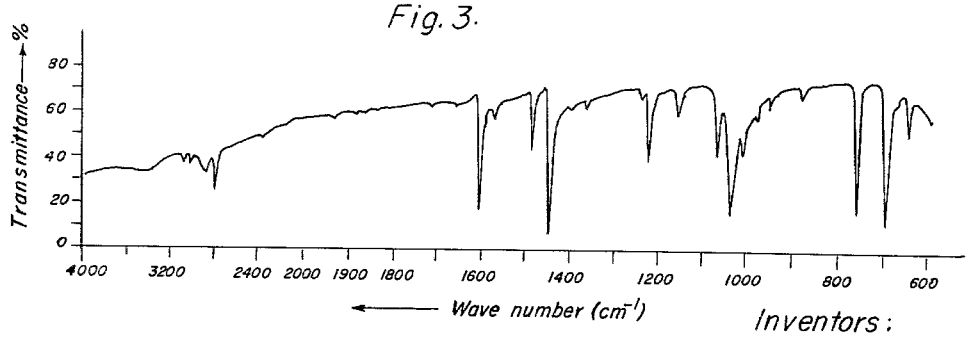

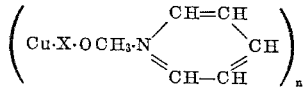

wherein $n$ is an integer and is at least 1, and X is chlorine or bromine, may be prepared;

FIG. 2 is the infra red spectra of our compound prepared by the alternative routes demonstrated in FIG. 1 when the halogen is chlorine; and FIG. 3 is the infra red spectra of our compound prepared by the alternative routes shown in FIG. 1 in which bromine is substituted for the chlorine in the compound of FIG. 2.

As FIG. 1 illustrates, there are several alternative ways of producing the compounds of our invention. A cuprous salt selected from the group consisting of cuprous chloride and cuprous bromide may be dissolved in anhydrous methanol and reacted with oxygen either in the presence or absence of pyridine. In the presence of pyridine, the reaction goes directly along path A as shown in FIG. 1. The first step may be the formation of the pyridine complex with the cuprous salt. In the absence of pyridine, the reaction proceeds to an intermediate compound as shown along route B, which, when pyridine is then added, proceeds along route C to produce the same final compound as is produced along path A.

The conversion of cuprous bromide or cuprous chloride to the corresponding cupric salts or the conversion of cupric bromide or cupric chloride to the corresponding cuprous salts is well known in the art and forms no part of this invention. Because of the ready commercial availability of either cupric or cuprous salts, there is no incentive, in practicing our invention, to convert either the cuprous salts to the corresponding cupric salts or vice versa, as a separate step of the process. Nevertheless, such an alternative is not excluded.

Cupric bromide or cupric chloride may be dissolved in methanol and reacted either, first, with an alkali methoxide as illustrated along path D, to produce the same intermediate as produced by the reaction of the cuprous salt with oxygen in the methanol solution as illustrated along path B, which is then reacted with pyridine as illustrated along path C, to produce the desired compound, or the cupric bromide or cupric chloride may be reacted with pyridine to produce the pyridine complex of the cupric salt which is then reacted with the alkali metal methoxide to produce the desired final compound. When the starting copper salt is either cuprous chloride or cupric chloride, the product no matter which procedure is used, has the infra red spectra shown in FIG. 2. When the starting compound is either cuprous bromide or cupric bromide, the final product no matter which process is used, has the infra red spectra shown in FIG. 3.

Table I shows the result obtained by elemental analysis of the compound containing chlorine whose infra red spectrum is shown in FIG. 2.

TABLE I

| | Calc. for $(Cu \cdot Cl \cdot OCH_3 \cdot C_5H_5N)_n$ | Found |
|---|---|---|
| Cu | 30.8 | 30.3 |
| N | 6.7 | 6.6 |
| Cl | 17.0 | 17.3 |
| C | 34.4 | 33.6 |
| H | 3.8 | 3.7 |

Such analysis confirms the empirical formula but does not define $n$. The numerical value to be assigned to $n$ can only be determined by determining the molecular weight. Unfortunately, such a determination depends on being able to dissolve the product in a solvent and so far we have been unable to find any solvent in which the green crystalline complex is soluble, except under conditions in which it reacts to form a new compound. Because of the well known ability of copper in the divalent state to form four-coordinate complexes, we believe that our compounds have one of the structures A, B, C, D or E.

(A)

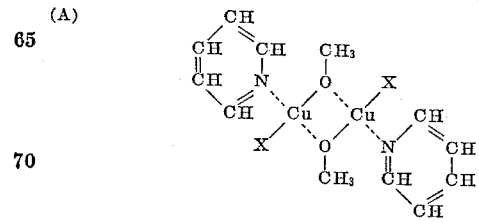

(B) 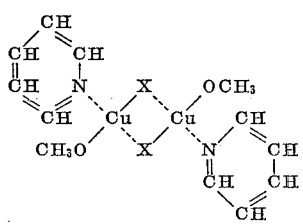

(C) 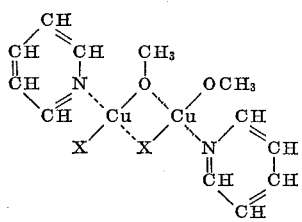

(D) 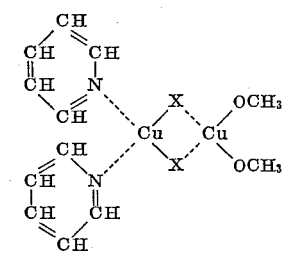

(E) 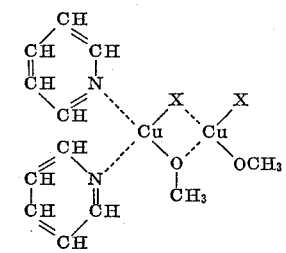

where in each case X is either chlorine or bromine. The fact that the compounds in which X is either chlorine or bromine are crystalline compounds indicates that the materials are of low molecular weight and therefore we believe that n is most likely 2 and in any case probably does not exceed 6 or 8, but it could be as low as 1. These cupric complexes and their method of preparation are disclosed and claimed in our copending application, Serial No. 425,995, filed December 22, 1964, as a division of this application.

Surprisingly enough, these green, crystalline compounds cannot be prepared from such closely related materials as cuprous iodide, alkyl-substituted pyridines, or ethanol.

Our unique complexes may be used as catalysts for the oxidation of 2,6-disubstituted phenols for the preparation of either phenylene oxide polymers or diphenoquinones, according to the following schematic diagram, where $m$ is an integer having a value of at least 10, R is a monovalent substituent selected from the group consisting of hydrocarbon and halohydrocarbon having at least 2 carbon atoms and Y is a monovalent substituent selected from the group consisting of hydrogen, chlorine, bromine, and iodine.

It is to be understood that the reaction is not a direct oxidation as illustrated, but an oxidation involving participation of our unique copper complex catalysts in a self-condensation reaction between two or more molecules of the starting phenol.

The phenols which can be oxidized by our unique catalysts are represented by the formula shown in Equation I. Typical examples of such phenols are by way of example, 2,6-dimethylphenol, 2,6-diethylphenol, the 2,6-dibutylphenols, 2,6-dilaurylphenol, the 2,6-dipropylphenols, 2,6-diphenylphenol, the 2,6-di(chlorophenoxy)phenols, 2,6-di(chloroethyl)phenol, 2-methyl-6-isobutylphenol, 2-methyl-6-phenylphenol, 2,6-dibenzylphenol, 2,6-ditolylphenol, 2,6-di(chloropropyl)phenol, 2,6-di(2',4'-dichlorophenyl)phenol, 2,6-dimethyl-4-chlorophenol, 2,6-dimethyl-4-bromophenol, 2,6-dimethyl-4-iodophenol, 2,6-diethyl-4-chlorophenol, the 2,6-dibutyl-4-bromophenols, 2,6-dilauryl-4-iodophenols, the 2,6-dipropylchlorophenols, 2,6-diphenyl-4-bromophenol, the 2,6-di(chlorophenoxy)-4-chlorophenols, 2,6-di(chloroethyl)-4-bromophenol, 2-methyl-4-bromo-6-isobutylphenol, 2-methyl-4-chloro-6-phenylphenol, 2,6-dibenzyl-4-iodophenol, 2,6-ditolyl-4-chlorophenol, 2,6-di(chloropropyl)-4-chlorophenol, etc.

The preference of the oxidation reaction to involve the para position is so pronounced that even though this position is substituted with a halogen other than fluorine, the halogen will be removed even though the meta positions are unsubstituted. In such a case, the halogen atom reacts with and inactivates one molecule of copper catalyst. Therefore, it is necessary to use one mole of catalyst for each atom of halogen removed unless, as we have found, one mole of free base is present for each atom of halogen which will be removed, in which case only a catalytic amount of our unique catalyst needs to be used as is true when hydrogen occupies the para position, e.g., in the order of 0.1 to 10 mole percent based on the moles of phenol to be oxidized. Examples of suitable bases which may be used are the alkali metal hydroxides, alkali metal alkoxides, tetraalkyl ammonium alkoxides, tetraalkyl ammonium hydroxides, etc., specific examples of which are sodium hydroxide, potassium hydroxide, cesium hydroxide, lithium hydroxide, sodium methylate (sodium methoxide), potassium ethoxide, lithium propoxide, tetramethyl ammonium hydroxide, tetraethyl ammonium methoxide, etc. In this reaction the products are polyphenylene oxides.

Halomethyl groups in the two ortho positions are so hydrolytically reactive that they produce undesirable by-products in the oxidation reaction. Therefore, we prefer to exclude such phenols from such oxidation reaction mixtures as the principal reactant, although they may be present in small quantities as modifiers. Other ring substituents such as nitro, cyano, carboxyl, formyl, etc., which are reactive with amines or copper salts should also be excluded as substituents of the phenols used as the principal Equation I

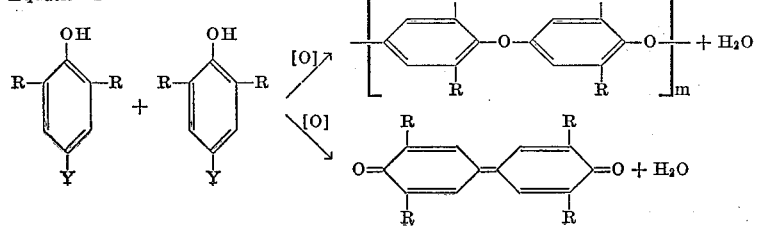

reactants, although phenols containing these groups can be used in minor amounts as modifiers of the polymer.

The general method of oxidizing phenols using our unique catalysts is to pass oxygen or an oxygen-containing gas through a mixture of one or more 2,6-disubstituted monohydric, monocyclic phenols as the starting material in the presence of our green crystalline cupric complex. In this case, the product is always the diphenoquinone corresponding to the starting phenol. However, if an amine, and preferably a tertiary amine, is present in addition to that added as a constituent of the green, crystalline catalyst, but product nominally is the polyphenylene ethers except as noted below. Primary and secondary amines, but not tertiary amines, react and become part of the product molecule. We, therefore, prefer to use tertiary amines when preparing polyphenylene ethers and specifically to use pyridine.

When the substituents in the 2- or 6-position have a three-dimensional structure approaching that of a sphere they limit the oxidation reaction of the phenols to the formation of diphenoquinones. When such a substituent is a radical having an α-tertiary carbon atom, e.g., tertiary butyl and tertiary amyl, etc., it is so bulky that the presence of only one such radical in the 2- or 6-position will prevent the formation of the polyarylene ethers. Bulky groups such as isopropyl appear to be borderline in that in a normal oxidation reaction, they will produce both the diphenoquinone and the polyphenylene ether, with the latter predominating, when there is only one isopropyl substituent and the former predominating, when there are two such substituents. When aryl substituents occupy both the 2- and the 6-position, diphenoquinones are also produced exclusively. Otherwise, when the two substituents in the 2,6-position are hydrocarbon or halohydrocarbon radicals having at least 2 carbon atoms, the products are the polyphenylene ethers, if a tertiary amine is present, unless the water of reaction is removed as fast as it is formed, in which case again the diphenoquinones are the main product.

Any of the well known tertiary amines may be used in conjunction with our green crystalline catalyst when it is desired to prepare polyphenylene ethers. Examples are the aliphatic tertiary amines, such as trimethylamine, triethylamine, tripropylamine, tributylamine, trisecondary propylamine, diethylmethylamine, dimethylpropylamine, allyldiethylamine, dimethyl-n-butylamine, diethylisopropylamine, benzyldimethylamine, dioctylbenzylamine, dioctylchlorobenzylamine, dimethylcyclohexylamine, dimethylphenethylamine, benzylmethylethylamine, di(chlorophenethyl)bromobenzylamine, 1 - dimethylamino - 2-phenylpropane, 1-dimethylamine-4-pentane, etc. When aliphatic tertiary amines are used, we prefer that at least two of the aliphatic groups be straight chain hydrocarbon groups.

In general, tertiary polyamines would behave in the same way as tertiary monoamines in our reaction, except of course, the amount used would only have to be that amount necessary to give the equivalent amount of amino groups. Typical examples of aliphatic tertiary polyamines are the N,N,N',N'-tetraalkylethylenediamines, the N,N,N',N' - tetraalkylpropanediamines, the N,N,N',N'-tetraalkylbutanediamines, the N,N,N',N'-tetraalkylpentanediamines, the N, N', N',N", N"-pentalkyldiethylenetriamines, etc. Likewise, the polyamines may be mixed tertiary aliphatic and tertiary aromatic amines, e.g., piperidinoalkylpyridines, dialkylaminoalkylpyridines, morpholinoalkylpyridines, etc. Typical examples of these amines are: N,N,N',N'-tetramethylethylenediamine, N-ethyl - N,N',N' - trimethylethylenediamine, N-methyl-N,N',N'-triethylethylenediamine, N,N,N',N'-tetramethyl-1,3 - propanediamine, N,N,N',N' - tetraethylethylenediamine, N,N-dimethyl-N',N'-diethylethylenediamine, 1,2-bis-(2-methylpiperidino)ethane, N,N,N',N'-tetra-n-hexylethylenediamine, N,N,N',N'-tetra-n-amylethylenediamine, 1,2-bispiperidinoethane, N,N,N',N'-tetraisobutylethylenediamine, N,N,N',N'-tetramethyl-1,3-butanediamine, 1,2-bis(2,6-dimethylpiperidino)ethane, N,N-didecyl-N',N'-dimethylethylenediamine, N-methyl, N',N',N",N" - tetraethyldiethylenetriamine, N-decyl-N,N',N'-triethylethylenediamine, 2-(β - piperidinoethyl)pyridine, 2-(β-dimethylaminoethyl)-6-methylpyridine, 2-(β-dimethylaminoethyl) pyridine, and 2-(β-morpholinoethyl)pyridine, etc.

Examples of cyclic amines are the pyridines, such as pyridine itself, quinuclidine, the dipyridyls, the N-alkyl pyrroles, the N-alkyl pyrrollidines, the N-alkyl piperidines, the N-alkyl diazoles, the N-alkyl triazoles, the diazines, the triazines, the quinolines, the diquinoyls, the isoquinolines, the N-alkyl tetrahydroquinolines, the N-alkyl tetrahydroisoquinolines, the phenanthrolines, the N-alkyl morpholines, etc., including the ring-substituted products of these cyclic amines whereby one or more of the hydrogen atoms on the carbons forming the ring are substituted by groups which may be alkyl (for example, methyl, ethyl, propyl, butyl, amyl, hexyl, heptyl, octyl, etc., and isomers and the homologues thereof), alkoxy (for example, methoxy, ethoxy, propoxy, butoxy, etc., and isomers and homologues thereof), aryl (for example, phenyl, tolyl, dimethylphenyl, chlorophenyl, bromotolyl, naphthyl, chlorobromonaphthtyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that when piperidines, pyrroles, pyrrolidines, diazoles, tetrahydroquinolines, tetrahydroisoquinolines, etc., are used they are tertiary amines whereby an alkyl hydrocarbon radical, such as those listed above for the ring substituents, is also attached to the amine nitrogen group, e.g., N-methylpyrrole, N-methyl tetrahydroquinoline, N-methyl tetrahydroisoquinoline, N-methyl piperidine, N-methyl pyrrolidine, N-methylimidazole, N-methyl-1,2,4-triazole, N-decylpiperidine, N-decylpyrrolidine, N-isobutylpiperidine, 1-decyl-2-methylpiperidine, N-isopropylpyrrolidine, N-cyclohexylpiperidine, etc.

In carrying out the oxidation, the phenol is usually dissolved in a solvent which may be pyridine, alcohols, ketones, hydrocarbons, chlorohydrocarbons, nitrohydrocarbons, ethers, esters, amides, mixed ether esters, sulfoxides, etc., the only requirement being that they do not interfere or enter into the oxidation reaction. Oxygen or an oxygen-containing gas is bubbled into the reaction mixture in the presence of our preformed green crystalline cupric complex. It is believed that our catalyst enters into reaction with the phenol in some manner, and goes into solution with the oxygen or oxygen-containing gas, which is bubbled into the reaction mixture, regenerating the catalyst which then reacts with more phenol. If the polyphenylene ether resins are the desired product, it is preferable to prevent the escape of the water formed by the reaction of oxygen from the reaction vessel or at least to control the escape of water so that there is always one mole of water present for each mole of copper catalyst. However, if diphenoquinones are the desired product and the structure of the starting phenol would nominally produce the polyphenylene ether if a tertiary amine were present, as explained above, then diphenoquinones can still be obtained, in spite of the presence of the tertiary amine, but provision must be made for the removal of the water of reaction as fast as it is formed. This can be done for example by sweeping with an inert gas, by carrying out the reaction at subatmospheric pressure, by azeotropic distillation, or by the use of open reaction vessels, by heat, or any combination thereof. In carrying out the reaction, oxygen can be used alone or it can be diluted with an inert gas such as nitrogen, helium, argon, etc., or air itself can be used.

Since the reaction is usually exothermic, the reaction can become overheated resulting in the formation of undesirable products. Generally, the oxidation reaction should be initiated at as low a tempearture as the reaction will start, as evidenced by the reaction becoming exothermic. It is preferable to control the oxidation reaction so that the maximum temperature does not exceed 100° C., and preferably does not exceed 80° C. The heat of reaction may be removed, for example by radiation convection, or by cooling coils which can be either immersed in or surround the reaction vessel.

Generally, the passage of oxygen into the reaction mixture is continued until no more heat is generated, or the desired amount of oxygen is absorbed. Alternatively, the same or different phenol may be continuously added during the oxidation reaction to produce mixed products.

To terminate the reaction, the catalyst system is destroyed by the addition of an acid preferably a mineral acid such as hydrochloric or sulfuric acid, or the product may be removed from the presence of the catalyst, either by filtering off the product if it has precipitated, or by pouring the reaction mixture into a material which is a solvent for the catalyst system but a non-solvent for the product. Alternatively, copper may be precipitated as an insoluble compound and filtered from the solution. After the product is precipitated, it may be dissolved and reprecipitated any desirable number of times to remove impurities. Finally, it is filtered and washed free of any remaining contaminants.

Modifiers of the reaction may be added to the reaction mixture to yield products which have improved properties over the products prepared in the absence of modifiers. Such modifiers are anion exchange resins, nitroaromatics such as mono-, di- and trinitrobenzenes, mono-, di- and trinitrophenols, etc., peroxide deactivators such as heavy metals and their oxides, adsorbents such as activated charcoal, silica gel, aluminum, etc.

In order that those skilled in the art may better understand our invention, the following examples are given which are illustrative of the practice of our invention and are not intended for purposes of limitation. In the examples, all parts are by weight, unless stated otherwise. Examples 1–4 give methods of preparation of a cupric complex disclosed and claimed in our above referenced copending application which is a division of this application.

*Example 1*

A reaction mixture containing 0.5 grams of cuprous chloride, 2 ml. of dry pyridine and 50 ml. of dry methanol were stirred in an atmosphere of oxygen for 16 hours in an apparatus designed so that the amount of oxygen absorbed could be determined. During the reaction 38.8 ml. of oxygen were absorbed, and a green crystalline solid had precipitated from the reaction mixture, which, after filtering from the reaction mixture and drying, weighed 1 gram, or 95.5% of theory.

The infra red absorption spectra of this compound is identical with that shown in FIG. 2 and its elemental analysis is given in Table I.

*Example 2*

A solution of 0.01 mole of sodium methoxide in methanol was added to a solution of 0.01 mole of cupric chloride (1.345 grams) in 50 ml. of anhydrous methanol. A green precipitate was filtered off and dried, a sample was analyzed for copper, and found to have 48.8% copper which is the correct amount for the empirical formula $CuClOCH_3$. This reaction was then repeated and without filtering off the precipitate, 0.025 mole of pyridine was added to the suspension and stirred for 2 hours, by which time the precipitate had turned to a green crystalline compound whose infra red spectra was identical with that obtained with the product of Example 1.

*Example 3*

The pyridine complex of cupric chloride was prepared by reacting 6.75 grams of cupric chloride with 10 ml. of pyridine in 300 ml. methanol as solvent. The complex was isolated and analyzed and found to have 22% copper as compared to 21.75% copper calculated for the compound $CuCl_2 \cdot 2C_6H_5N$. A solution of 1.8 grams of this complex dissolved in 20 ml. of anhydrous methanol was reacted with 5 ml. of 1.21 N sodium methoxide in anhydrous methanol. A green crystalline compound precipitated from the reaction mixture which had an infra red spectra identical with that of the compound obtained in Example 1.

*Example 4*

The pyridine complex of cupric bromide was prepared by reacting 11.2 grams of cupric bromide dissolved in 300 ml. of methanol with 10 ml. of pyridine. This pyridine complex was isolated and 2.04 grams were suspended in 20 ml. of anhydrous methanol, to which was added 5 ml. of 1.018 N sodium methoxide in anhydrous methanol with stirring. The original solution was heterogeneous but turned blue during the reaction which was carried out under nitrogen to exclude oxygen. The reaction mixture turns deep green during the one-half hour reaction, but remains heterogeneous. The reaction mixture was filtered at the end to isolate a deep green solid which was air-dried. The infra red spectra of this isolated material is shown in FIG. 3 which is nearly identical with the infra red spectra shown in FIG. 2. The product was analyzed for copper by electrolysis and found to have 25.0% copper as compared to 25.05% calculated for the empirical formula $Cu \cdot Br \cdot OCH_3 \cdot C_6H_5N$.

When the above reaction was repeated, the product was analyzed for carbon and hydrogen, and found to have 28.1% carbon and 3.2% hydrogen as compared with 28.6% carbon and 3.15% hydrogen calculated for the above empirical formula.

*Example 5*

Oxygen was bubbled into a solution of 0.977 gram of 2,6-dimethyl phenol (0.008 mole) dissolved in 40 ml. of nitrobenzene in the presence of 0.50 gram (0.0012 mole) of the green crystalline compound identical with that prepared in Example 1. The reaction was carried out in a flask equipped with a reflux condenser, immersed in a 30° C. constant temperature bath at atmospheric pressure. At the end of 91 minutes, 97.4 ml. (0.00396 mole) of oxygen had been absorbed. The reaction mixture had become heterogeneous with formation of a red solid precipitate. The red solid was filtered from the solution. It had a melting point of 205° C. and an infra red analysis showed it to be 3,3',5,5'-tetramethyldiphenoquinone.

*Example 6*

Oxygen was passed through a solution of 0.732 gram of 2,6-dimethylphenol (0.006 mole), dissolved in 31 ml. of benzene containing 9 ml. of pyridine and 0.025 gram of green crystalline compound identical with that prepared in Example 1. The reaction was carried out in a closed system equipped to measure oxygen consumption, immersed in a 30° C. constant temperature bath. During a reaction time of 68 minutes, 77.7 ml. of oxygen (0.0032 mole) were absorbed. At the end of this time, the reaction mixture was poured into 160 ml. of methanol containing 1 ml. of concentrated hydrochloric acid, whereupon a polymer precipitated. It was washed in methanol, redissolved in chloroform and reprecipitated again in 200 ml. of methanol containing 2 ml. of concentrated hydrochloric acid. The polymer was washed with methanol and dried. It had an intrinsic viscosity measured in chloroform of 0.75. The infra red spectra showed that this polymer was poly-2,6-dimethylphenylene oxide.

*Example 7*

A solution of 2 grams (0.01 mole) of 2,6-dimethyl-4-bromophenol dissolved in a 20 ml. of benzene was reacted with 6 ml. of a 40% solution of benzyltrimethyl ammonium methoxide (0.01 mole) in the presence of 0.440 milligram (0.001 mole) of a green crystalline compound identical with that prepared in Example 1. The reaction was carried out in a nitrogen atmosphere for 1 hour. During this time, the original green solution turned to a red-black solution. The reaction mixture was poured into 100 ml. of methanol containing 5 ml. of concentrated hydrochloric acid to precipitate a polymer. This was separated from the reaction mixture and dissolved in chloroform and re-precipitated in 200 ml. of methanol to obtain 1.22 grams of a stringy white polymer having an intrinsic viscosity when dissolved in chloroform solvent of 1.09. Infra red analysis of this polymer showed it to be poly-2,6-dimethylphenylene ether. The above polymer is obtained by removal of bromine from the starting phenol. It is therefore to be expected that the yield of polymer would vary with whether or not there was 1 mole of alkali present for each mole of bromine to be released. However, we also found that the yield tended to decrease if more than sufficient alkali was present. For example, when Example 7 was repeated but the ratio of benzyltrimethyl ammonium methoxide to 2,6-dimethyl-4-bromophenol was varied as shown in the following Table II, the yield of polymer was as indicated.

TABLE II

| Ratio of base to phenol: | Yield of polymer |
|---|---|
| 1.85 | 0 |
| 1.19 | 100 |
| 0.74 | 90 |
| 0.37 | 46 |
| 0.19 | 21 |
| 0 | 0 |

*Example 8*

Oxygen was passed through a solution of 0.977 gram of 2,6-dimethylphenol (0.008 mole), dissolved in 31 ml. of benzene containing 9 ml. of pyridine and 0.150 gram of green crystalline compound identical with that prepared in Example 4. The reaction was carried out in a closed system equipped to measure oxygen consumption, immersed in a 30° C. constant temperature bath. During the reaction time of 78 minutes, 97.1 ml. of oxygen (99% of the theoretical amount of 98 ml.) were absorbed. At the end of this time, the reaction mixture was poured into 200 ml. of methanol containing 2 ml. of concentrated hydrochloric acid, whereupon a polymer precipitated. It was washed in methanol, redissolved in chloroform, re-precipitated in methanol, and dried. It had an intrinsic viscosity measured in chloroform of 1.46. The polymer was identified as poly-2,6-dimethylphenylene oxide.

When the above reaction was repeated but using only 0.732 gram of 2,6-dimethylphenol (0.006 mole), there were 76.3 ml. of oxygen (theoretical 73.7 ml.) absorbed in a reaction time of 64 minutes. The polymer was isolated in the same way and had an intrinsic viscosity of 1.38.

Because of their excellent mechanical, chemical, electrical and thermal properties, the polymers obtained by use of our catalysts have many and varied uses. For example, they can be used in molding powder formulations, either alone or mixed with various fillers, such as wood flour, diatomaceous earth, carbon black, silica, etc., to make molded parts, such as spur, helical, worm or bevel gears, ratchets, bearings, cams, impact parts, gaskets, valve seats for high pressure oil and gas systems or other chemical fluids requiring resistance to chemicals, etc. They may be mixed with abrasives, such as garnet, silicon carbide, diamond bort etc., to make abrasive discs, papers, etc. They can be used to prepare molded, calendered, or extruded articles, films, coatings, threads, filaments, tapes and the like. They can be applied to a broad spectrum of uses in the form of sheets, rods, tapes, etc., and are useful in electrical applications, such as in cable terminals, terminal blocks, backing for electrical circuits, as components of dynamoelectric machines that operate at high temperatures, etc. Films of these materials can be prepared by suitable means, such as by dissolving or suspending them in a suitable solvent, followed by spreading on a surface from which the polymer is removed after evaporation of the solvent, by calendering or extrusion, etc. These films (either oriented or not) are useful as metal or fiber liners, containers, covers, closures, electrical insulating tapes, as sound recording tapes, pipe and wire tapes, etc. As a coating material they can be applied as a solution or suspension to any convenient foundation where a surface possessing their excellent properities is desired. They can be used as an encapsulation material, for electrical insulation, for example, as a wire enamel, potting compound, etc. They can be extruded from melt, solution or suspension into a precipitating solvent or evaporating medium, etc. The fibers so produced (oriented or not) can be woven into fabrics useful in many applications, for example, as filter cloths where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, etc. The polymers may also be mixed with various fillers, modifying agents, etc., such as dyes, pigments, stabilizers, plasticizers, etc.

The non-polymeric products exhibit the same utility as the same compounds prepared by any other method. Thus, the quinones and diphenoquinones can be used as dyes, etc., and in the reduced form as antioxidants. In addition, these compounds can be used as chemical intermediates in the preparation of other materials, such as polymers. For example, the diphenoquinones can be reduced to dihydroxy compounds of the bis-phenol type which are useful in preparing epoxide, polyester, polycarbonate, etc., resins.

Obviously, other modifications and variations of the present invention are possible in the light of the above teachings. It is, therefore, to be understood that changes may be made in the particular embodiments of the invention described which are within the full intended scope of the invention as defined by the appended claims.

What we claim as new and desire to secure by Letters Patent of the United States is:

1. The process of preparing self-condensation products of phenols selected from the group consisting of polyphenylene ethers and diphenoquinones which comprises reacting oxygen in the presence of a cupric complex having the empirical formula

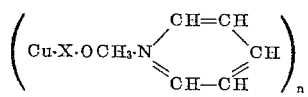

where X is selected from the group consisting of chlorine and bromine and $n$ is an integer and is at least 1, with a phenol having the structural formula

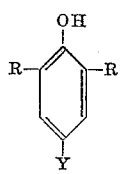

where each R is a monovalent substituent selected from the group consisting of hydrocarbon radicals, halohydrocarbon radicals having at least two carbon atoms, hydrocarbonoxy radicals and halohydrocarbonoxy radicals having at least two carbon atoms with the proviso that, when polyphenylene ethers are the desired product, no more than one R is aryl and each R is free of a tertiary α-carbon atom, and Y is a monovalent radical selected from the group consisting of hydrogen, chlorine, bromine and iodine, with the proviso that when Y is one of the named halogens the reaction is carried out in the presence of at least one equivalent of free base for each atom of halogen present in the phenol and when Y is hydrogen and the desired products are polyphenylene ethers, a tertriary amine is present in the reaction mixture.

2. The process of claim 1 wherein each R is a hydrocarbon radical and Y is hydrogen.

3. The process of claim 1 wherein each R is alkyl and Y is hydrogen.

4. The process of claim 1 wherein each R is methyl and Y is hydrogen.

5. The process of preparing self-condensation products of phenols selected from the group consisting of polyphenylene ethers and diphenoquinones which comprises reacting oxygen with 2,6-dimethyl phenol in the presence of a cupric complex having the empirical formula

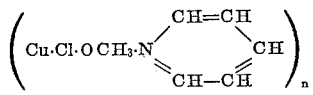

wherein $n$ is an integer and is at least 1, with the proviso that when polyphenylene ethers are the desired products, a tertiary amine is present in the reaction mixture.

6. The process of preparing polyphenylene oxides which comprises reacting oxygen with 2,6-dimethyl-4-bromophenol in the presence of at least one mole of a free base for each mol of bromine present in the phenol and in the presence of the cupric complex having the empirical formula

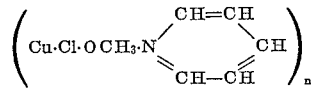

where $n$ is at least 1.

7. The process of oxidizing phenols to diphenoquinones which comprises reacting oxygen in the presence of the cupric complex having the empirical formula

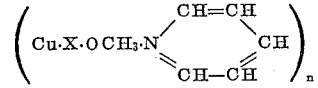

where X is selected from the group consisting of chlorine and bromine and $n$ is an integer and is at least 1, with a phenol having the structural formula

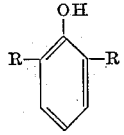

where each R is a monovalent hydrocarbon radical, said reaction being carried out in the absence of any amine other than that present in said cupric complex.

8. The process of oxidizing phenols to diphenoquinones which comprises reacting oxygen in the presence of a cupric complex having the empirical formula

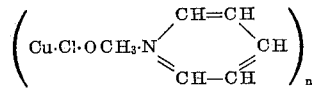

where $n$ is an integer and is at least 1, with a phenol having the structural formula

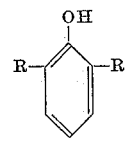

where each R is a monovalent hydrocarbon radical, said reaction being carried out in the absence of any amine other than that present in said cupric complex.

9. The process of claim 8 wherein each R is an alkyl radical.

10. The process of claim 8 wherein each R is methyl.

References Cited by the Examiner
UNITED STATES PATENTS

| | | | |
|---|---|---|---|
| 2,686,814 | 8/1954 | Jones | 260—396 |
| 2,767,187 | 10/1956 | Shrader et al. | 260—270 |
| 2,785,188 | 3/1957 | Coe | 260—396 |
| 2,827,463 | 3/1958 | Schaeffer | 260—270 |
| 2,856,414 | 10/1958 | Robeson et al. | 260—396 |
| 2,911,387 | 11/1959 | Vandenberg | 260—47 |
| 2,915,501 | 12/1959 | Guest et al. | 260—47 |
| 2,940,988 | 6/1960 | Coppinger | 260—396 |

FOREIGN PATENTS

| | | |
|---|---|---|
| 1,022,376 | 1/1958 | Germany. |
| 568,818 | 4/1945 | Great Britain. |

OTHER REFERENCES

Brackman et al.: Recueil des Travaux Chimiques, vol. 74, pages 937–55, 1021,–39 (1955).

Hay et al.: J. Am. Chem. Soc., vol. 81, pp. 6335–6 (1959).

Terent'ev et al.: Chem. Abstracts, vol. 50, pages 4807e (1956).

LORRAINE A. WEINBERGER, *Primary Examiner.*

IRVING MARCUS, DUVAL McCLUTCHEN,
*Examiners.*